Patented Dec. 20, 1949

2,491,936

UNITED STATES PATENT OFFICE 2,491,936

POLYAMIDE COMPOSITIONS

Russell H. Schlattman, Richmond Heights, Mo., assignor to Monsanto Chemical Company, St. Louis, Mo., a corporation of Delaware No Drawing. Application June 5, 1948, Serial No. 31,402

10 Claims. (Cl. 260—30.8)

This invention relates to compositions comprising synthetic linear polyamides, and more particularly, this invention relates to compositions comprising ortho-sulfobenzimide, N-ethyl o,p-toluenesulfonamide and certain synthetic linear copolymers formed by the copolymerization of complementary amide-forming components.

The simple or two component polyamides formed by the polymerization of a single diamine and a single dicarboxylic acid have high melting and softening points and are well known as being excellent materials for the formation of synthetic fibers. However, these simple polyamides are generally not formed into films and sheets because their high melting points, microcrystalline structure and general insolubility in most solvents make the formation of sheets and films of simple polyamides difficult. Moreover, for the most part, sheets and films of plasticized simple polyamides cannot be prepared as most of the materials which are known to have plasticizing action when incorporated with other plasticizable resins such as cellulose esters, polyvinyl chloride and other polymerized vinyl resins are incompatible with the simple polyamides. On the other hand, the four or more component polyamides, such as are described in U. S. Patent No. 2,252,554 have much lower softening and melting points and otherwise more nearly resemble plasticizable resins than do the simple or two component polyamides and, therefore, possess the potentialities of being very desirable for the purpose of forming sheets and films of polyamide compositions of satisfactory clarity and flexibility. Likewise, the three component polyamides, such as are described in U. S. Patents Nos. 2,252,555 and 2,285,009, by reason of their lower softening points and melting points and less pronounced crystallinity, as compared to the simple polyamides, possess the potentialities of being very desirable for sheet and film-forming purposes. The four or more component polyamides are preferred over the three component polyamides for the purpose of this invention, as the three component polyamides in many respects more nearly resemble the two component or simple polyamides than the plasticizable resins which the four or more component polyamides more nearly resemble, although similar advantageous results may be achieved by the use of the three component polyamides in the practice of this invention.

While the four or more component polyamides have been formed into sheets and films which have a variety of utilities, and while these four or more component polyamides can be successfully plasticized with certain aryl sulfonamide and certain N-alkyl arylsulfonamides and in particular N-ethyl o,p-toluenesulfonamide to form sheets and films which exhibit increased pliability over the unplasticized four or more component polyamides and thereby increased utility, both the unplasticized polyamide and the sulfonamide plasticized composition possess the deficiency of poor flexibility or pliability at low temperatures thereby preventing the use of such compositions in applications where flexibility at low temperatures is a requisite.

Flexible plastic compositions are extensively used in a wide variety of applications. Such applications include flexible wire insulation or protective covering for wire insulation, flexible artificial or simulated leather, and flexible films for packaging purposes. While polyamide compositions are preferred in such applications by reason of their inherent toughness over other types of plastic films, they do possess a decided disadvantage due to their relatively poor low temperature flexibility and their tendency to become hard and brittle at low temperatures. Such characteristics limit their utility in colder regions.

N-ethyl o,p-toluenesulfonamide has been recognized by those skilled in the art as being one of the most flexibilizing low temperature plasticizers for four or more component polyamide resins. But even this flexibilizing plasticizer is not sufficiently flexibilizing at low temperatures to permit the use of the polyamide resins to their fullest advantage.

Herein, the expression "N-ethyl o,p-toluenesulfonamide" is to be interpreted as meaning a mixture of the isomeric compounds N-ethyl o-toluenesulfonamide and N-ethyl p-toluenesulfonamide in all proportions to the substantial exclusion of N-ethyl m-toluenesulfonamide, which manner of expression is used by, and familiar to, those skilled in the art.

It is an object of this invention to provide improved polyamide compositions, particularly polyamide compositions containing four or more component polyamide resins, which exhibit increased flexibility at low temperatures.

Further, it is an object of this invention to provide improved plasticized polyamide compositions, particularly polyamide compositions containing four or more component polyamide resins, which exhibit increased flexibility at low temperatures.

Moreover, it is an object of this invention to provide improved polyamide compositions, particularly polyamide compositions containing four or more component polyamide resins and plasticized with N-ethyl o,p-toluenesulfonamide and containing o-sulfobenzimide, which exhibit increased flexibility at low temperatures.

I have now discovered that the low temperature flexibility of certain polyamide compositions plasticized with N-ethyl o,p-toluenesulfonamide may be improved by incorporating therein o-sulfobenzimide. Moreover, I have discovered that certain mixtures of N-ethyl o,p-toluenesulfonamide and o-sulfobenzimide when such mixtures are used to plasticize certain polyamide resins exhibit a synergistic flexibilizing effect on the polyamide resin to such an extent that the low temperature flexibility of the polyamide composition plasticized with the mixture of N-ethyl o,p-toluenesulfonamide and o-sulfobenzimide is superior to the low temperature flexibility of a polyamide composition plasticized with equivalent amounts of either o-sulfobenzimide or N-ethyl o,p-toluenesulfonamide alone.

The polyamides most suitable for incorporation into the novel compositions of this invention are those nylon-type multicomponent polyamide resins formed by the copolymerization, as described in U. S. Patent 2,252,554, of at least four different amide-forming reactants, at least one of which is a diprimary diamine and at least one other of which is a dicarboxylic acid. The other two polyamide-forming reactants may be selected from diprimary diamines different from the first selected diprimary diamine, dicarboxylic acids or amide-forming derivatives of dibasic carboxylic acids different from the first selected dicarboxylic acid or amide-forming derivatives of a dibasic dicarboxylic acid, diamines having at least one hydrogen atom on each amino group, polymerizable monoamino carboxylic acids and amide-forming derivatives of monoamino carboxylic acids. For the purposes of describing the multicomponent polyamides suitable for the plasticized compositions of this invention, a salt of a diamine and a dibasic acid is considered as representing two polyamide-forming reactants. The amine and acid polyamide-forming reactants are used in substantially equal molecular amide-forming proportions. By substantially equal amide-forming proportions is meant that not more than 5 mol per cent excess of either amino or acid amide-forming functional groups are employed, that is, the reaction mixture must not contain substantially more than 5 mol per cent excess of either amino or acid amide-forming groups of their equivalents.

Polyamides formed by the condensation polymerization of more than four amide-forming reactants (in substantially equal molecular amide-forming proportions), have properties quite similar to those polyamides having four amide-forming components and, therefore, are equally suitable for incorporation into the plasticized polyamide compositions of this invention.

While the preferred polyamides for incorporation into the compositions of this invention are substantially the "four or more component interpolyamides" described in U. S. Patents Nos. 2,252,554, the so-called "three component interpolyamides" described in U. S. Patent Nos. 2,252,555 and 2,285,009, although not preferred, may also be used. The three component polyamide described in the latter two patents are those prepared by the condensation polymerization of two diprimary diamines and one dibasic carboxylic acid; one diprimary diamine and two dibasic carboxylic acids; or a diprimary diamine, a dibasic carboxylic acid and a polymerizable monoaminomonocarboxylic acid.

The preferred reactants for the preparation of the more suitable four or more component polyamides are diamines which may be represented by $H_2N-CH_2-R-CH_2-NH_2$ and dicarboxylic acids of the type $HOOC-R_1-COOH$ wherein R and $R_1$ represent polymethylene groups, suitably of 2 to 12 methylene groups and preferably of 4 to 8 methylene groups. However, R and $R_1$ in addition to being the preferred polymethylene groups, may be, in part, other substituted alkylene groups or aryl groups such as phenylene and substituted phenylenes.

The four component linear polyamides as described above are illustrated by such interpolymers as follows:

Hexamethylene adipamide-decamethylene sebacamide

Decamethylene sebacamide-heptamethylene pimelamide

Heptamethylene pimelamide - hexamethylene adipamide

Octamethylene suberamide-hexamethylene adipamide

Nonamethylene azelamide-hexamethylene adipamide

Nonamethylene azelamide-heptamethylene adipamide

Pentamethylene sebacamide - hexamethylene adipamide

Pentamethylene adipamide-decamethylene sebacamide

Pentamethylene pimelamide-hexamethylene sebacamide

Hexamethylene suberamide-decamethylene sebacamide

Hexamethylene suberamide-decamethylene adipamide

The three component polyamides which are suitable for use in the preparation of the compositions of this invention are those linear polyamides which are produced by the condensation polymerization of three component amide-forming reaction mixtures which are illustrated as follows:

Hexamethylene diamine, adipic acid and sebacic acid

Decamethylene diamine, adipic acid and suberic acid

Hexamethylene diamine, pimelic acid and azelaic acid

Adipic acid, hexamethylene diamine and decamethylene diamine

Sebacic acid, pentamethylene diamine and hexamethylene diamine 6-amino caproic acid, hexamethylene diamine and sebacic acid 6-amino caproic acid pentamethylene diamine and pimelic acid In the above-mentioned three component polyamides, the monoaminocarboxylic acids utilized may be represented by the formula $$H_2N-CH_2-R_2-CH_2-COOH$$

wherein $R_2$ represents at least 3 and not more than 7 methylene groups.

The common use of N-ethyl o,p-toluenesulfonamide as a flexibilizing plasticizer for four or more than four component polyamide resins, permits the preparation of compositions that are superior in flexibility to unplasticized four or more than four component polyamide resins. The degree of the increased flexibility in such compositions is relatively proportional to the amount of N-ethyl o,p-toluenesulfonamide present in the composition as a plasticizer. Thus, relatively small amounts of plasticizer, or, in other words, a low degree of plasticization, results in a slight increase in flexibility. As the amount of plasticizer is increased, the degree of flexibility is increased. Since, plasticization also effects other physical properties of the plasticized composition, such as toughness and softness, the degree to which the flexibility of a polyamide resin composition may be increased is governed to a certain extent by the amount of degradation in other physical properties the composition can withstand without losing its utility. Therefore, as successively increasing amounts of N-ethyl o,p-toluenesulfonamide are added to a four or more than four component polyamide resin, the flexibility successively increases but the hardness decreases or the softness increases. A point is reached in such a plasticization process where further plasticization would result in compositions that are too soft to be of practical utility. As a practical example, a four or more than four component polyamide resin composition containing 25% by weight of total composition of N-ethyl o,p-toluenesulfonamide exhibits better low temperature flexibility than does an unplasticized four or more than four component polyamide resin and still retains a significant degree of the inherent toughness of polyamide resins. If, however, the content of N-ethyl o,p-toluenesulfonamide in the plasticized composition is increased to 50% by weight of the total composition, the composition, while exhibiting a still greater degree of flexibility, has become so significantly softer and weaker than the composition containing 25% N-ethyl o,p-toluenesulfonamide, that the composition's practical utility becomes very limited.

In the preparation of the novel plasticized compositions of this invention, a plasticizer composed of a mixture of N-ethyl o,p-toluenesulfonamide and o-sulfobenzimide is used. It was found that a four or more than four component polyamide composition plasticized with a plasticizer composed of from 80 to 95 parts of N-ethyl o,p-toluenesulfonamide and 20 to 5 parts of o-sulfobenzimide exhibited low temperature flexibility characteristics that were superior to those exhibited by a polyamide composition similarly plasticized with either N-ethyl o,p-toluenesulfonamide or o-sulfobenzimide alone.

The following procedures hereinafter described in detail are referred to in the examples wherein specimens are prepared and evaluated for their respective characteristics.

*Evaluation procedure No. 1*

Plasticizers were incorporated into the polyamide resin through the use of a conventional 2″ x 6″ two-roll differential speed-roll mill.

X grams of plasticizer were intimately mixed in a suitable beaker with 30.0—X grams of the polyamide resin, and 0.15 gram of sodium stearate which served as a mold release or lubricant. This mixture was then placed on a 2″ x 6″ two-roll differential speed roll mill wherein the temperature of the rolls were maintained approximately 15° C. above the melting point of the polyamide resin. The mixture was blended and compounded on the roll mill for 10 minutes after which time a homogeneous composition had been formed.

After this homogeneous composition had been formed the rolls were cooled in such a manner that one roll was maintained 40–50° C. cooler than the other hotter roll. During this cooling period, the composition transferred entirely to the cooler roll. When the temperatures of the two rolls had reached 50° C. and 100° C., the polyamide composition was removed by applying a doctor blade to the roll containing the composition and removing the continuous sheet which had been formed.

In order to obtain a composition of uniform thickness suitable for subsequent physical testing, the polyamide composition prepared in the previously mentioned manner was placed in a 5″ x 5″ x 0.040″ mold and placed in a steam heated hydraulic press under a pressure of 2,000 pounds per square inch pressure and maintained under that pressure at a temperature of 325° F. for one minute after which time the press was cooled, the pressure released, and the uniformly molded polyamide composition removed.

The molded polyamide composition was then conditioned in a constant temperature room at 26° C. and 50% relative humidity for seven days prior to further testing.

*Evaluation procedure No. 2*

The low temperature flexibility of the molded conditioned polyamide compositions was determined by the method described by Clash and Berg in Ind. Eng. Chem. 34, 1218 (1942). This method is well known to those skilled in the art and is quite commonly used as a means of determining the relative flexibility characteristics of plastic compositions.

*Example I*

A composition composed of a four component polyamide resin, a hexamethylene adipamide-decamethylene sebacamide interpolymer prepared by the condensation polymerization of 41.2 parts by weight of hexamethylene diammonium adipate and 58.8 parts by weight of decamethylene diammonium sebacate and having a M. P. of 140° C., was prepared in the manner described under procedure No. 1.

The low temperature flexibility of the composition was +1° C. as determined according to procedure No. 2.

*Example II*

A composition of a plasticized four component polyamide resin was prepared according to procedure No. 1 containing as a plasticizer 25% by weight of total composition of N-ethyl o,p-toluenesulfonamide. The polyamide resin was a four component polyamide resin, a hexamethylene adipamide-decamethylene sebacamide interpolymer prepared by the condensation polymerization of 41.2 parts by weight of hexamethylene diammonium adipate and 58.8 parts by weight of decamethylene diammonium sebacate and having a M. P. of 140° C.

The low temperature flexibility of the composition was −10° C. as determined according to procedure No. 2.

*Example III*

A composition of a plasticized polyamide resin was prepared according to procedure No. 1, utilizing the same polyamide resin of Example II and containing as a plasticizer 15% by weight of total composition of N-ethyl o,p-toluenesulfonamide.

The low temperature flexibility of the composition was −5° C. as determined according to procedure No. 2.

*Example IV*

A composition of a plasticized polyamide resin was prepared according to procedure No. 1, utilizing the same polyamide resin of Example II and containing as a plasticizer 25% by weight of total composition of o-sulfobenzimide.

The low temperature flexibility of the composition was +7° C. as determined according to procedure No. 2.

*Example V*

A composition of a plasticized polyamide resin was prepared according to procedure No. 1, utilizing the same polyamide resin of Example II and containing as a plasticizer 15% by weight of total composition of o-sulfobenzimide.

The low temperature flexibility of the composition was +10° C. as determined according to procedure No. 2.

*Example VI*

A composition of a plasticized polyamide resin was prepared according to procedure No. 1, utilizing the same polyamide resin of Example II and containing as a plasticizer 25% by weight of total composition of a mixture consisting of 80 parts by weight of N-ethyl o,p-toluenesulfonamide and 20 parts by weight of o-sulfobenzimide.

The low temperature flexibility of the composition was −16° C. as determined according to procedure No. 2.

*Example VII*

A composition of a plasticized polyamide resin was prepared according to procedure No. 1, utilizing the same polyamide resin of Example II and containing as a plasticizer 25% by weight of total composition of a mixture consisting of 90 parts by weight of N-ethyl o,p-toluenesulfonamide and 10 parts by weight of o-sulfobenzimide.

The low temperature flexibility of the composition was −17° C. as determined according to procedure No. 2.

*Example VIII*

A composition of a plasticized polyamide resin was prepared according to procedure No. 1, utilizing the same polyamide resin of Example II and containing as a plasticizer 25% by weight of total composition of a mixture consisting of 95 parts by weight of N-ethyl o,p-toluenesulfonamide and 5 parts by weight of o-sulfobenzimide.

The low temperature flexibility of the composition was −18° C. as determined according to procedure No. 2.

*Example IX*

A composition of a plasticized polyamide resin was prepared according to procedure No. 1, utilizing the same polyamide resin of Example II and containing as a plasticizer 25% by weight of total composition of a mixture consisting of 97.5 parts by weight of N-ethyl o,p-toluenesulfonamide and 2.5 parts by weight of o-sulfobenzimide.

The low temperature flexibility of the composition was −11° C. as determined according to procedure No. 2.

*Example X*

A composition of a plasticized polyamide resin was prepared according to procedure No. 1, utilizing the same polyamide resin of Example II and containing as a plasticizer 15% by weight of total composition of a mixture consisting of 80 parts by weight of N-ethyl o,p-toluenesulfonamide and 20 parts by weight of o-sulfobenzimide.

The low temperature flexibility of the composition was −10° C. as determined according to procedure No. 2.

Example I illustrates the low temperature flexibility of an unplasticized four component polyamide resin. Examples II and III illustrate the increase in flexibility of a plasticized four component polyamide resin composition that is plasticized with N-ethyl o,p-toluenesulfonamide to different degrees of plasticization. These examples clearly show the increased flexibility that is obtained with increased plasticization. Further increases in the degree of plasticization would result in still greater increased flexibility. Examples IV and V illustrate the effect of o-sulfobenzimide as a plasticizer for four component polyamide resin compositions. It is seen that o-sulfobenzimide as a primary plasticizer does not impart improved low temperature characteristics to polyamide resins.

However, Examples VI, VII, VIII and X show that in a certain range of composition, mixtures of N-ethyl o,p-toluenesulfonamide and o-sulfobenzimide exhibit a synergistic flexibilizing effect on polyamide resins, resulting in plasticized compositions with low temperature flexibility properties that are superior to those that would be obtained using either material alone as a plasticizer as shown in Examples II, III, IV, and V. Thus plasticizing polyamide resins to a certain specific plasticizer concentration or degree with the novel mixtures of this invention produces polyamide resin compositions exhibiting flexibility characteristics superior to those that could be attained by plasticizing with either component alone. Stated in another way, plasticized polyamide resin compositions with definite flexibility characteristics, prepared by the novel compositions of this invention would require less plasticizer than would be required if either of the two compounds, N-ethyl o,p-toluenesulfonamide or o-sulfobenzimide, were used alone.

Examples VI, VII, and VIII illustrate substantially the range of the ratio of o-sulfobenzimide to N-ethyl o,p-toluenesulfonamide in the novel compositions of this invention. As shown in Example IX, if the ratio is reduced much lower than that shown in Example VIII, the synergistic effect of the composition begins to disappear. If the ratio is increased much greater than that shown in Example VI, the compositions begin to exhibit signs of incompatibility and hence lose their practical utility.

Thus, as herein described, as the amount of plasticizer in a polyamide composition is increased to increase the degree of flexibility of the composition, degradation in other physical properties also takes place. Through the use of the novel compositions of this invention, this degradation of physical properties is minimized in that less plasticizer is needed to obtain a given flexibility and consequently does not permit as serious degradation of other properties which are responsive to plasticizer content.

I claim:

1. A polyamide composition comprising a mixture consisting of substantially 80 to 95 parts by weight of N-ethyl o,p-toluenesulfonamide and substantially 20 to 5 parts by weight of ortho-sulfobenzimide, and a polyamide resin, said mixture being present in an amount up to 50% by weight of the total composition and said polyamide resin being selected from the group consisting of (A) polyamide resins formed by the condensation polymerization of 3 different complementary amide-forming reactants selected from the group consisting of (a) diprimary diamines of the type H₂N—CH₂—R—CH₂—NH₂ wherein R represents at least 4 and not more than 8 methylene groups (b) dicarboxylic acids of the type

HOOC—R₁—COOH wherein R₁ represents at least 4 and not more than 8 methylene groups, (B) polyamide resins formed by the condensation polymerization of a diprimary diamine of the type

H₂N—CH₂—R—CH₂—NH₂ wherein R represents at least 4 and not more than 8 methylene groups, a dicarboxylic acid of the type HOOC—R₁—COOH wherein R₁ represents at least 4 and not more than 8 methylene groups and a monoaminocarboxylic acid of the type

H₂N—CH₂—R₂—CH₂—COOH wherein R₂ represents at least 3 and not more than 7 methylene groups, and (C) polyamide resins formed by the condensation polymerization of at least 4 different amide-forming reactants of which at least 2 are diprimary diamines of the type

H₂N—CH₂—R—CH₂—NH₂ wherein R represents at least 4 and not more than 8 methylene groups and at least 2 different complementary amide-forming reactants selected from the class consisting of (a) dicarboxylic acids of the type

HOOC—R₁—COOH wherein R₁ represents at least 4 and not more than 8 methylene groups and (b) amide-forming derivatives of said type of carboxylic acids.

2. A polyamide composition comprising a mixture consisting of substantially 80 to 95 parts by weight of N-ethyl o,p-toluenesulfonamide and substantially 20 to 5 parts by weight of orthosulfobenzimide, and a polyamide resin, said mixture being present in an amount up to 25% by weight of the total composition and said polyamide resin being selected from the group consisting of (A) polyamide resins formed by the condensation polymerization of 3 different complementary amide-forming reactants selected from the group consisting of (a) diprimary diamines of the type H₂N—CH₂—R—CH₂—NH₂ wherein R represents at least 4 and not more than 8 methylene groups (b) dicarboxylic acids of the type

HOOC—R₁—COOH wherein R₁ represents at least 4 and not more than 8 methylene groups, (B) polyamide resins formed by the condensation polymerization of a diprimary diamine of the type

H₂N—CH₂—R—CH₂—NH₂ wherein R represents at least 4 and not more than 8 methylene groups, a dicarboxylic acid of the type HOOC—R₁—COOH wherein R₁ represents at least 4 and not more than 8 methylene groups and a monoaminocarboxylic acid of the type

H₂N—CH₂—R₂—CH₂—COOH wherein R₂ represents at least 3 and not more than 7 methylene groups, and (C) polyamide resins formed by the condensation polymerization of at least 4 different amide-forming reactants of which at least 2 are diprimary diamines of the type

H₂N—CH₂—R—CH₂—NH₂ wherein R represents at least 4 and not more than 8 methylene groups and at least 2 different complementary amide-forming reactants selected from the class consisting of (a) dicarboxylic acids of the type

HOOC—R₁—COOH wherein R₁ represents at least 4 and not more than 8 methylene groups and (b) amide-forming derivatives of said type of carboxylic acids.

3. A polyamide composition comprising a mixture consisting of substantially 80 to 95 parts by weight of N-ethyl o,p-toluenesulfonamide and substantially 20 to 5 parts by weight of orthosulfobenzimide, and a polyamide resin, said mixture being present in an amount up to 50% by weight of the total composition and said polyamide resin being formed by the condensation polymerization of at least 4 different amide-forming reactants of which at least 2 are diprimary diamines of the type

H₂N—CH₂—R—CH₂—NH₂ wherein R represents at least 4 and not more than 8 methylene groups and at least 2 different complementary amide-forming reactants selected from the class consisting of (a) dicarboxylic acids of the type

HOOC—R₁—COOH wherein R₁ represents at least 4 and not more than 8 methylene groups and (b) amide-forming derivatives of said type of carboxylic acids.

4. A polyamide composition comprising a mixture consisting of substantially 80 to 95 parts by weight of N-ethyl o,p-toluenesulfonamide and substantially 20 to 5 parts by weight of orthosulfobenzimide, and a polyamide resin, said mixture being present in an amount up to 25% by weight of the total composition and said polyamide resin being formed by the condensation polymerization of at least 4 different amide-forming reactants of which at least 2 are diprimary diamines of the type

H₂N—CH₂—R—CH₂—NH₂ wherein R represents at least 4 and not more than 8 methylene groups and at least 2 different complementary amide-forming reactants selected from the class consisting of (a) dicarboxylic acids of the type

HOOC—R₁—COOH wherein R₁ represents at least 4 and not more than 8 methylene groups and (b) amide-forming derivatives of said type of carboxylic acids.

5. A polyamide composition comprising a mixture consisting of substantially 80 to 95 parts by weight of N-ethyl o,p-toluenesulfonamide and substantially 20 to 5 parts by weight of orthosulfobenzimide, and a polyamide resin, said mixture being present in an amount up to 50% by weight of the total composition and said polyamide resin being formed by the condensation polymerization of 3 different complementary amide-forming reactants selected from the group consisting of (a) diprimary diamines of the type

H₂N—CH₂—R—CH₂—NH₂ wherein R represents at least 4 and not more than 8 methylene groups (b) dicarboxylic acids of the type $$HOOC—R_1—COOH$$

wherein $R_1$ represents at least 4 and not more than 8 methylene groups.

6. A polyamide composition comprising a mixture consisting of substantially 80 to 95 parts by weight of N-ethyl o,p-toluenesulfonamide and substantially 20 to 5 parts by weight of ortho-sulfobenzimide, and a polyamide resin, said mixture being present in an amount up to 25% by weight of the total composition and said polyamide resin being formed by the condensation polymerization of 3 different complementary amide-forming reactants selected from the group consisting of (a) diprimary diamines of the type $$H_2N—CH_2—R—CH_2—NH_2$$

wherein R represents at least 4 and not more than 8 methylene groups (b) dicarboxylic acids of the type $$HOOC—R_1—COOH$$

wherein $R_1$ represents at least 4 and not more than 8 methylene groups.

7. A polyamide composition comprising a mixture consisting of substantially 80 to 95 parts by weight of N-ethyl o,p-toluenesulfonamide and substantially 20 to 5 parts by weight of ortho-sulfobenzimide, and a polyamide resin, said mixture being present in an amount up to 50% by weight of the total composition and said polyamide resin being formed by the condensation polymerization of hexamethylene diamine, decamethylene diamine, adipic acid and sebacic acid.

8. A polyamide composition comprising a mixture consisting of substantially 80 to 95 parts by weight of N-ethyl o,p-toluenesulfonamide and substantially 20 to 5 parts by weight of ortho-sulfobenzimide, and a polyamide resin, said mixture being present in an amount up to 25% by weight of the total composition and said polyamide resin being formed by the condensation polymerization of hexamethylene diamine, decamethylene diamine, adipic acid and sebacic acid.

9. A polyamide composition comprising a mixture consisting of substantially 80 to 95 parts by weight of N-ethyl o,p-toluenesulfonamide and substantially 20 to 5 parts by weight of ortho-sulfobenzimide, and a polyamide resin, said mixture being present in an amount up to 50% by weight of the total composition and said polyamide resin being formed by the condensation polymerization of hexamethylene diamine, adipic acid and sebacic acid.

10. A polyamide composition comprising a mixture consisting of substantially 80 to 95 parts by weight of N-ethyl o,p-toluenesulfonamide and substantially 20 to 5 parts by weight of ortho-sulfobenzimide, and a polyamide resin, said mixture being present in an amount up to 25% by weight of the total composition and said polyamide resin being formed by the condensation polymerization of hexamethylene diamine, adipic acid and sebacic acid.

RUSSELL H. SCHLATTMAN.

REFERENCES CITED

The following references are of record in the file of this patent:

UNITED STATES PATENTS

| Number | Name | Date |
|--------|------|------|
| 2,214,405 | Coffman | Sept. 10, 1940 |